United States Patent [19]

Ullmann et al.

[11] 4,205,212
[45] May 27, 1980

[54] ELECTRO-EROSION MACHINE TOOLS AND HEAD ASSEMBLIES THEREFOR

[75] Inventors: Werner Ullmann, Locarno; Ernst Bühler, Tenero; Beat Kilcher, Ascona; Herbert Ruh, Laupen-Wald; Arno Sieg, Locarno, all of Switzerland

[73] Assignee: A.G. für industrielle Elektronik AGIE Losone b. Locarno, Losone, Switzerland

[21] Appl. No.: 791,055

[22] Filed: Apr. 26, 1977

[30] Foreign Application Priority Data

Aug. 20, 1976 [CH] Switzerland .......... 10633/76

[51] Int. Cl.² .......... B23K 1/12
[52] U.S. Cl. .......... 219/69 W
[58] Field of Search .......... 219/69 W, 69 V, 69 R, 219/69 M; 204/206, 211; 308/3 R, 5 R, 9, 237; 339/17 C, 255 R, 255 RT, 256 S, 117 P

[56] References Cited

U.S. PATENT DOCUMENTS

| | | | |
|---|---|---|---|
| 2,366,509 | 1/1945 | Francisco | 204/206 |
| 2,905,274 | 9/1959 | Cook | 188/65.1 |
| 2,968,784 | 1/1961 | Mason | 339/255 R |
| 3,070,770 | 12/1962 | Mercier | 339/255 RT |
| 3,366,771 | 1/1968 | Jackson et al. | 219/69 W |
| 3,495,258 | 2/1970 | Kholodnov et al. | 219/69 W |
| 3,822,374 | 7/1974 | Ullmann et al. | 219/69 W |
| 3,928,163 | 12/1975 | Ullmann et al. | 219/69 W |
| 3,943,322 | 3/1976 | Lehmann et al. | 219/69 W |
| 4,052,583 | 10/1977 | Inoue | 219/69 M |

FOREIGN PATENT DOCUMENTS

| | | | |
|---|---|---|---|
| 526365 | 9/1972 | Switzerland | 219/69 W |
| 559599 | 3/1975 | Switzerland . | |
| 569547 | 11/1975 | Switzerland . | |
| 776172 | 6/1957 | United Kingdom . | |

OTHER PUBLICATIONS

AGIE Cut DEM 15, "Electrical Discharge Cutting Machine", 9/75.

*Primary Examiner*—B. A. Reynolds
*Assistant Examiner*—Clifford C. Shaw
*Attorney, Agent, or Firm*—Frishauf, Holtz, Goodman & Woodward

[57] ABSTRACT

A head assembly for an electro-erosion machine tool comprises, in a housing, a guide for guiding the moving filamentary or strip-form tool electrode and first contact means for supplying erosion energy to the electrode. The scavenging medium is fed into the housing so as to cool the contact means and guide, and leaves it by way of a nozzle through which also the electrode leaves the housing on its way to another head assembly arranged on the opposite side of the location where machining is performed, the scavenging medium being thereby fed to the machining location as an envelope coaxial to the electrode. Second contact means for contacting the workpiece to be machined are fixed to the nozzle and the connections to each contact means are arranged for low inductive energy loss.

11 Claims, 15 Drawing Figures

ELECTRO-EROSION MACHINE TOOLS AND HEAD ASSEMBLIES THEREFOR

INTRODUCTION

This invention relates to electro-erosion machine tools of the kind wherein a tool electrode made of elongate material, i.e. a tool electrode in the form of a filament or strip, is used to cut a workpiece by electro-erosion in the presence of a flushing fluid, the tool electrode being kept under tension and being continuously renewed at the machining location by continuously feeding the elongate material from a supply thereof to the machining location i.e. so that the electrode, while cutting, is continuously moving in the direction of its length through the machining location. More particularly, the invention relates to a head assembly for being arranged in a machine tool of the kind described on one of two opposite sides of the machining location (a second head assembly being provided on the other of these two sides), the head assembly being operable for guiding the tool electrode, for making electrical contact with the tool electrode and with a workpiece which is positioned at the machining location and for directing the flushing fluid to the machining location.

In a machine tool of the kind described, the tool electrode does not come into contact with the workpiece to machine it but is instead spaced from the material to be eroded by a short distance termed the "workgap" the length of which has an effect on the rate of erosion and on other parameters, such as the surface finish of the machined surface. The length of the workgap is therefore made adjustable so that it can be optimised for particular machining operations to be performed. However, during erosion, erosion products are produced which have the same effect as a variation from the optimum of the length of the workgap and hence it is the function of the flushing fluid to flush these erosion products from the workgap and to thereby enable more uniform and controllable machining to be done.

For the machining, the tool electrode has to be provided with electrical energy, i.e. there has to be connected to the tool electrode and to the workpiece an erosion energy generator such that there is formed a circuit for energy to pass from the generator to the tool electrode, then across the workgap from the tool electrode to the workpiece, and then back to the generator. Clearly, therefore, the efficiency of the connections to the moving tool electrode and to the workpiece affects the uniformity of the energy flow and hence the machining.

Finally, it will be obvious that the electrode has to be kept tensioned and accurately guided in order that it should occupy an accurately defined position as it is moved laterally into the workpiece to cut the latter.

Each of these functions in an electro-erosion machine tool is thus very important and much work has been done in attempts to improve them.

It is an object of the invention to further improve them. In addition, for the purpose of facilitating manufacture and servicing of such machine tools, it is an object of the invention to combine the means for performing these functions into a single head assembly in such manner that further advantages, the nature of which will become apparent from the following discussion, can be obtained.

Hitherto, there has not been any proposal which solves the problem of how to integrate the three functions skilfully in a uniform device, and in particular the following problems which, according to further objects of the invention it is proposed to solve, have hitherto not been satisfied:

1. Galvanic separation of the current feed to the two guide heads required, between which the filiform or strip-form electrode is secured.
2. Prevention of inductive energy losses from the energy feed lines.
3. Cooling of the current feed contacts.
4. Symmetrical stressing of the tool electrode in its mechanical guide zones.
5. Design of the assembly such that the tool electrode, subsequent to opening of a cover of the assembly, does not require to be threaded-in, but requires merely to be inserted laterally.

In British Pat. No. 776,172 it is proposed to guide the tool electrode by annular die elements and to maintain the presence of the dielectric flushing fluid by having the entire working zone immersed in a bath thereof. The current feed is effected by way of the guiding elements themselves and hence can become defective as the guiding elements widen out, due to wear, to afford some clearance or play. Due to the fact that the working zone is immersed in a bath of the flushing fluid it becomes more difficult to visually inspect the progress of the machining, time is lost while filling and emptying the bath before and after a machining operation, and also it is difficult to effect any sort of control over the flushing conditions at the actual point of machining. In U.S. Pat. No. 3,495,258 (Kolodnov et al), the tool electrode is guided by intersecting pins which again at the same time serve also for current feed. In this case also, the entire processing or machining zone must be dipped into the flushing fluid and can lose its precision due to contact wear. U.S. Pat. No. 3,912,899 (to which Swiss No. 569,547 corresponds) and Swiss Specification No. 571,380 (Lehmann et al) disclose a system wherein the problems of current feed and geometrical guiding of the wire are separately solved. Again, however, these specifications propose to immerse the working zone completely in the flushing fluid.

In the above-mentioned prior art disclosures, the arrangement of the current feed lines does not exclude inductive losses. The same applies to Swiss Specification No. 526,365. In the case of this specification dies similar to those of the above-mentioned British Specification are employed as guide means and, further, it contains proposals for feeding the flushing fluid to the machining location in the form of jets. However, these jets are such that they can only lead to disorderly, diffuse flooding of the working zone. In the corresponding British and U.S. Pat. Nos. 1,419,992, and 3,822,374 (Ullmann et al) of the present Applicants, there is described in FIG. 4 an electrode guide which comprises a member defining a notch, and which is operable for feeding current to, and for geometrically guiding, the tool electrode, but with which the wear problem can be reduced by a particular manner of adjusting the position of the member. No proposals are made here however with regard to the flushing fluid supply. Such a proposal is described in U.S. Pat. No. 3,928,163 assigned to the assignee of this application. Here, the electrode is again guided in a notch but this notch is formed in a member made from non-conducting ceramic material. For the current feed, a separate contact member therefore has to be provided. Feeding of the flushing fluid is effected via a coaxial flushing device which is pivotably mounted so that it can be swung into or out of its position of use and which has a preset nozzle mouthpiece. However, the latter proposal is subject to several disadvantages, namely the wire cannot be completely engaged by the geometrical guiding means, the current feed is not located in a zone cooled by the flushing fluid, and the feed of electrical current is still subject to inductive loss effects.

As already mentioned, it is an object of the invention to provide a unitary head assembly which comprises the means for guiding the tool electrode, for feeding current to it and for feeding the flushing fluid. In the process of achieving this object, it is a further object to avoid the above-mentioned defects of the prior art and also to avoid the introduction of any new defects or difficulties of plant operation.

BRIEF DESCRIPTION OF THE INVENTION

According to one aspect of the invention there is provided a head assembly for being arranged in an electrode-erosion machine tool on one of two sides of a machining location wherein a workpiece is located during use of the machine tool, the head assembly being operable for guiding a tool electrode which is made of elongate material and which moves from said head assembly towards a further head assembly on the other of said two sides of said machining location, the head assembly further being operable for making electrical contact with said tool electrode and said workpiece and for directing scavenging fluid to the said machining location, the head assembly comprising:

a housing, inlet means leading to the interior of said housing for passing scavenging fluid to the interior of the housing such that said fluid fills the said interior, outlet means defining an opening between the interior and exterior of the housing through which said tool electrode can pass towards said workgap and through which said scavenging fluid can exit from the interior of the housing as an envelope surrounding the tool electrode, guide means mounted inside said housing for being cooled by the scavenging fluid therein and operable for guiding the tool electrode as it passes towards said outlet means by bearing against the tool electrode at least at a plurality of lines of contact which are symmetrically disposed around the tool electrode and are of equal length, first electrical contact means which is mounted inside said housing for being cooled by the scavenging fluid therein and which is operable for making electrical contact with said tool electrode, and second electrical contact means which is supported by said housing at a position close to said outlet means and which is operable for making electrical contact with said workpiece at a position close to said tool electrode.

According to a second aspect of the invention there is provided an electro-erosion machine tool comprising means for supporting a workpiece at a machining location, and first and second head assemblies mounted on respective opposite sides of said machining location for guiding an elongate material tool electrode between the two head assemblies and through the machining location for the tool electrode to machine the workpiece, each said head assembly being as described above.

DETAILED DESCRIPTION

Figure 1:
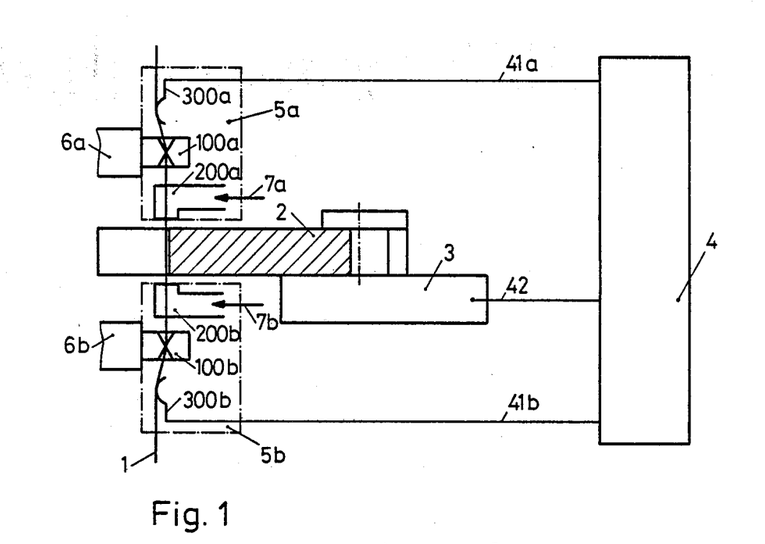
FIG. 1 is a diagrammatic view of an electrical pulse generator, a workpiece support means, a workpiece, and two head assemblies, the view illustrating the relative arrangement of, and the electrical connections between, these components in a cutting machine tool according to the invention.

The spark erosion cutting machine tool of FIG. 1 comprises an electrode 1 which may have a flat, filamentary or other suitable cross-sectional shape and which cuts through a workpiece 2 secured on a workpiece clamp 3 of the machine tool.

Above and below the workpiece respectively are two head assemblies 5a and 5b. These assemblies comprise, inside respective housings, respective first contact means 300a and 300b, respective feed means 200a and 200b for the flushing fluid 7a, 7b, and respective tool electrode guiding means 100a and 100b. The assemblies 5a and 5b themselves are secured to respective holding arms 6a and 6b, which, like the workpiece clamp 3, are component parts of the mechanical assemblies (not otherwise shown) of the machine tool. Also not shown is the supply and processing unit for the flushing fluid 7a, 7b. A spark generator 4 supplies electrical energy via the current feed lines 41a, 41b and 42 and the head assemblies 5a and 5b to the machining location. For simplicity in FIG. 1, the electrical connection between the generator 4 and the workpiece 3 is represented by a line connected directly between these two parts. In actual fact, however, in the invention, the head assemblies 5a and 5b comprise respective second contact means (not shown in FIG. 1) which make contact with the workpiece, and the connection between the generator 4 and the workpiece 3 is made by way of lines connected between the generator and the respective second contact means of the head assemblies.

Figure 2:
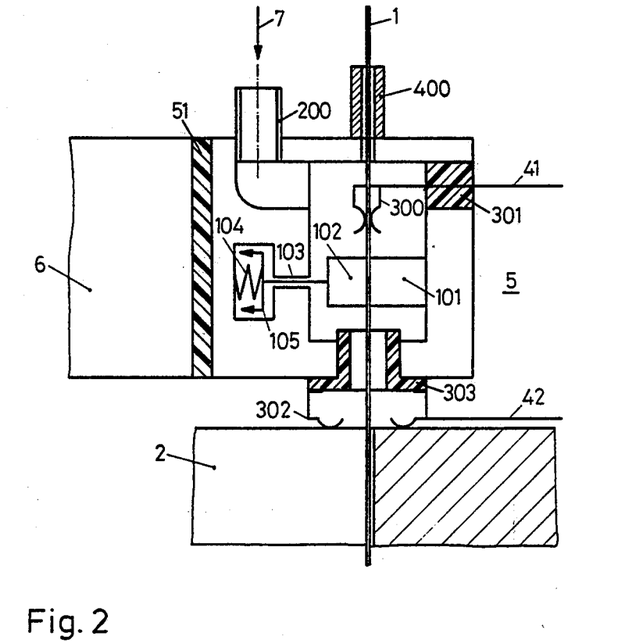
FIG. 2 is a diagrammatic sectional view of a head assembly according to the invention.

FIG. 2 shows the head assembly 5a in more detail although still partly in diagrammatic form. Since the two assemblies 5a and 5b are identical apart from the fact that one is upside down in relation to the other, the remainder of this description will simply refer to the head assembly 5 to show that it could be the assembly 5a or 5b which is being described. The assembly 5 is fixed to the holding arm 6, i.e. the arm 6a or 6b as appropriate, with a layer of electrical insulating material 51 interposed therebetween. As an alternative (not shown) the assembly 5 could be coupled to the arm 6 by means which enables the assembly to be rotated in the machining direction, hence enabling the guide means to be orientated during machining. The flushing fluid 7 is fed to the head assembly via an inlet duct 200. The tool electrode guiding means comprises a member 101 which has in it, for precise geometrical guiding of the electrode, a notch which is preferably V-shaped. The member 101 is secured within the housing 5 to be adjustable but rigid. In order to retain the electrode 1 in the notch, there is arranged opposite the member 101 a counter-member 102. The walls of the notch in the member 101 and adjacent side of the counter-member 102 bear against the tool electrode 1 along equal-length lines of contact located symmetrically around the periphery of the tool electrode 1, whereby stress at the wire surface is kept uniform. The counter-member 102 is mounted so as to be displaceable within the head assembly housing by means of a mounting arrangement 103, and is connected to a mechanical, electrical, hydraulic or pneumatic biassing means 104, which biases the counter-member 102 to move towards the member 101 and hence to maintain its contact with the tool electrode 1. In order to facilitate the introduction of the tool electrode during setting-up of the machine tool, prior to machining proper, there is provided also lift-off means 105 with the aid of which the counter-member 102 can be temporarily lifted-off and held away from the member 101 so that the tool electrode 1 can be moved laterally between the members 101 and 102, and then the member 102 can be released so the electrode becomes engaged between it and the member 101, i.e. so that the tool electrode does not each time have to be threaded down into and along the gap between the members. The function of the lift-off means 105 may be incorporated into the biasing means 104 or it may be a physically separate device.

The housing of the head assembly is hollow and bounds a chamber into which, via the inlet duct 200, the flushing medium 7 is fed so that it fills the chamber and thereby comes into contact with and cools all the devices present in the chamber, in particular the electrode contact means and the workpiece contact means 300 and 302 respectively. The flushing medium is supplied at a rate which is sufficient to maintain the chamber filled despite any leakages which may occur and despite the flow of the medium out of the outlet nozzle 303 through which also emerges the electrode 1. The medium 7 flowing from nozzle forms an envelope which concentrically surrounds and is in contact with the electrode. The nozzle 303 is made from electrically non-conductive material. In order that this coaxial flushing stream out of the nozzle may be effective to the maximum degree, the inlet duct 200 in the housing is arranged in such manner, and the head assembly is so constructed, that the devices within the housing of the head assembly do not greatly affect the flow of the medium, for example by introducing excessive turbulence. In connection with this object, the assembly of FIG. 2 could be modified so that the flushing medium is fed in near the bottom of the housing in FIG. 2, i.e. in the immediate vicinity of the nozzle 303 and/or the flushing medium may be sprayed into the housing, for example tangentially thereto (the housing then preferably having a round bore). The electrical connections of the lines 41 and 42 are established via the first contact means 300 to the electrode 1 and the second contact means 302 to the workpiece 2. Both contact means preferably comprise sliding contacts so designed that a contact surface of maximum size is available for transmitting the current. Alternatively, however, moving contact devices (not shown) can be employed. The first contact means 300 is secured to the interior of the head assembly housing by way of an insulating member 301 while the second contact means 302 is secured to the non-conductive nozzle 303. The contact means are so arranged that the feed lines 41 and 42 surround the smallest possible amount of material wherein it is possible that current might be induced and hence lost from the feed lines.

Figure 3:
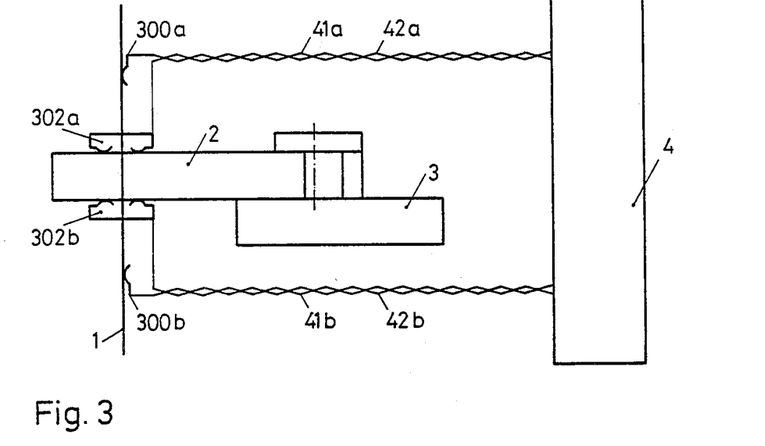
FIG. 3 is a diagrammatic view which shows how the head assembly of FIG. 2 may be connected to an electrical pulse generator.

It is the disadvantage of the arrangement shown in FIG. 1 that relatively voluminous metal elements may be disposed between the lines 41a, 41b and 42 and, thereby, considerable energy losses may occur due to electrical induction in such metal elements. It is therefore preferred that, as shown in FIG. 3, the discharge-pulse-generating generator 4 is so designed that there are two conductor pairs 41a, 42a and 41b, 42b. The conductors 41a and 42a lead to the first and second contact means 300a and 302a of the head assembly 5a while the conductors 41b and 42b lead to the first and second contact means 300b and 302b of the head assembly 5b. Each conductor pair is fed independently of the other by the generator 4 so that if contact between one of the contact means of one of the head assemblies and the tool electrode or workpiece as appropriate become disturbed, the contact means of the other head assembly does not become loaded with correspondingly higher current as might well occur if the conductor pairs were not fed independently (the result of such additional loading generally being overheating of the loaded contact means and possible rupture of the tool electrode). As well as being fed independently, each pair of conductors is formed as a low-induction line, i.e. the two conductors thereof are twisted together, and only separate from each other at the last possible moment. Additionally, the fact that the second contact means 302 is co-axial to the electrode 1 also reduces inductive loss.

During machining, since electrical pulses containing high frequency signal components are fed via the lines 41a and 41b to the tool electrode 1, the wire electrode 1 can act as a transmitter antenna, particularly that part of the electrode which has still to enter the leading head assembly and that part which has left the trailing head assembly and is on its way to whatever kind of used electrode storage or disposal means (not shown) are in use, and the transmissions therefrom may cause interference with the operation of other high frequency apparatus. Therefore, in order to reduce such transmissions, respective low pass filters may be arranged at the electrode inlet side of the leading head assembly and at the electrode outlet side of the trailing head assembly. Such filters can, as shown in FIG. 2, take the form of respective annular ferrite tubes 400 arranged so that the electrode passes through them as it enters the leading head assembly and as it leaves the trailing head assembly. In addition, a capacitor may be connected between the wire electrode 1 and the head assembly.

Figure 4A:
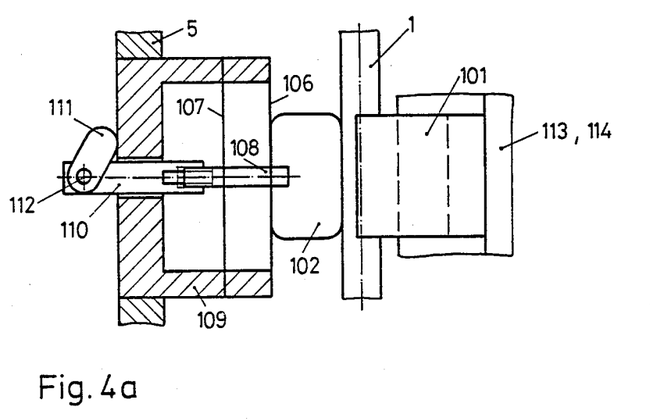
FIG. 4a is an elevation of a first tool electrode guide means which may be used in the head assembly of FIG. 2 and a sectional elevation of spring mounting means supporting one part of the guide means.
Figure 4B:
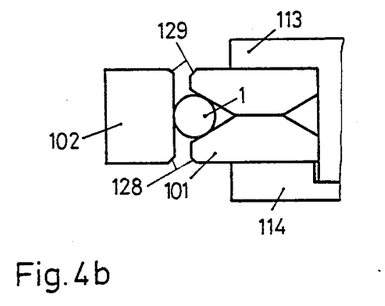
FIG. 4b is a plan of the guide means of FIG. 4a, FIG. 4c is a plan view of a modification of the guide means of FIG. 4a, FIG. 4d is a partly sectioned elevation of a second tool electrode guide means which may be used in the head assembly of FIG. 2.

As shown in FIGS. 4a and 4b, the tool electrode guide means can comprise a Vee-notched member 101 which is retained by releasable clamping members 113 and 114 in such a way that the clamping members can be released and the position of the member 101 adjusted as required and then the members 113 and 114 can be made to clamp and rigidly hold the member 101 in the position to which it was adjusted. A counter-member 102 is connected to a mandrel 108 which is in turn supported by two spring diaphragms 106 and 107 so that it and the counter-member 102 can be moved towards and away from the member 101 but are biassed to move towards it and are not rotatable in relation to it. The two spring diaphragms, which could be replaced by a pair of leaf springs for example (not shown), are supported by a cup-shaped member 109 which is adjustably mounted in a wall of the housing of the head assembly or is fixedly mounted in which case its position is accurately set during manufacture of the head assembly so that the counter-member is biassed towards the member 101 and presses on an electrode disposed between these two members with the desired force.

Although, as mentioned above, the spring diaphragms 106 and 107 could be replaced by leaf springs for example, the diaphragms are preferred because, being fixed all round the mandrel 108 and all round inside the member 109, they do not permit the flushing medium inside the head assembly housing to leak out past the mandrel. That end of the mandrel 108 which is remote from the counter-member 102 is connected to, by being screwed into, the inner end of an elongate member 110 of which the other end extends out of the head assembly housing through an aperture in the base of the cup-shaped member 109. A cam 111 is fixed to a shaft 112 which is in turn rotatably coupled to the outer end of the member 110 such that, by turning the shaft 112 by means not shown, the cam 111 turns, its camming surface bears against the member 109, and the member 110, the mandrel 108 and the counter-member 102 are all pulled back and held away from the member 101 in opposition to the biassing force of the diaphragms 106 and 107. This enables easier access for the electrode 1. The same means can also be employed for imparting the desired application pressure effect to the counter-member 102 relative to the wire electrode 1 or relative to the member 101.

As may be seen, the counter-member 102 has rounded edges at the top and bottom of that surface thereof which contacts the electrode so as to prevent damage to the electrode. Similar rounded edges are provided for those surfaces of the member 101 which contact the electrode, i.e. the walls of the notch in this member. As seen best in FIG. 4b, the vertical edges of the electrode contacting face of the counter-member 102 and the corresponding edges of the member 101 are provided with chamfers 128 and 129. The member 101 is made in two halves having respective tapers so that when the two halves are clamped together by the clamping members 113 and 114 the appropriate Vee-shaped notch is defined.

As seen best in FIG. 4b, the member 101 defines more than one wire guiding notch so that, following wear of one notch, it can be turned around in the clamp and then used again. It could also be formed with notches of different sizes to suit different electrode diameters. Also, depending on the purpose of utilization of the machine tool it will be possible to employ "force-locking" guiding of the wire due to the application force of the counter-member 102 exerted in accordance with FIG. 4b on the wire 1, or according to FIG. 4c there may be positively engaging guiding of the wire, inasmuch as then the counter-member 102 is pressed against the guide means 101 and a triangular aperture is formed for the wire. The said aperture may, if the notch is differently designed, also have some other polygonal form.

Figure 4C:
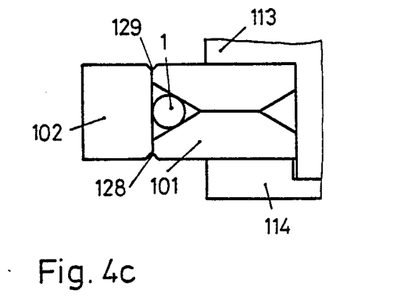
Figure 4D:
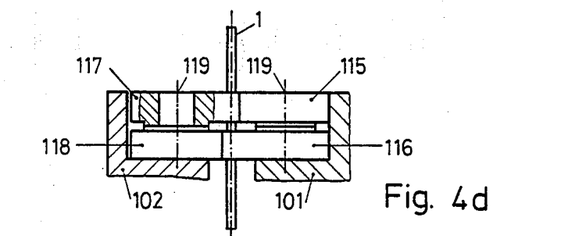
Figure 4E:
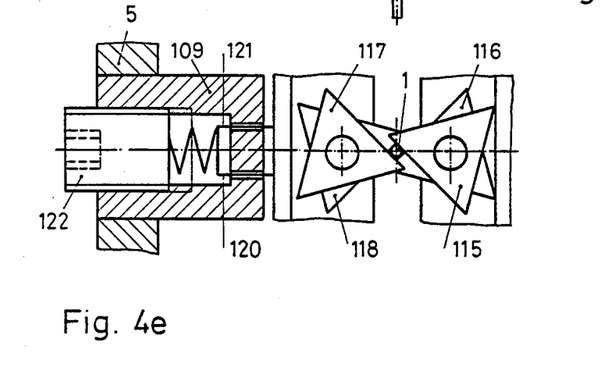
FIG. 4e is a plan view of the guide means of FIG. 4d and a sectioned view of spring mounting means supporting one part of the guide means.

The embodiment of the electrode, guide means shown in FIGS. 4d and 4e comprises two pivot pins 119 which are rigidly mounted on respective support members 101 and 102 and on which there are mounted respective pairs of triangular guide plates 115, 116 and 117, 118 which are manufactured from a very wear-resisting material and which can be employed several times by rotating them on the pins 119. The number of guide plates attached on each pin 119 may be greater than the two shown. The edges of the plates are rounded so that there is no risk of damage of the electrode 1. Furthermore, the contact lines relative to the electrode 1 are of symmetrical design, the two located opposite each other in each particular instance being arranged at the same level. The plates 115, 116, 117 and 118 are so rotated relative to each other on the pins 119 that there is formed in each instance on both sides (101 and 102) a V-form notch for guiding the wire. The member 102 is mounted in a holding element 109 to be fast against rotation but adjustable. In this case, this is achieved by providing two guiding bores for the pins 120 and 121 fast with the member 102. Due to the threaded pin 122, adjustment of the member 102 can be effected either with rigid linkage or (as shown) via a pressing-on spring, depending on whether it is endeavoured to achieve a "positively engaging" or a "force-locking" mode of guiding the wire in the V-shaped notches which form. A further device which may be provided for opening the electrode-guiding zone for insertion of the electrode is, in this case, not shown.

A further embodiment (not shown) of the guide means is the combination of the V-shaped slotted member 101 (FIGS. 4a, 4b, 4c) with, to form the counter-member 102, the arrangement of guide plates 117, 118 (FIGS. 4d 4e). In this case of this variant, the geometrical guide means bears at four locations against the surface of the electrode 1.

Figure 4F:
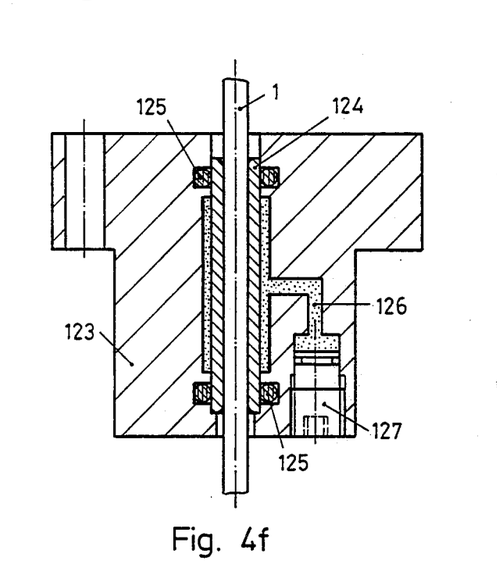
FIG. 4f is a sectioned elevation of a third tool electrode guide means which may be used in the head assembly of FIG. 2.

FIG. 4f shows a further embodiment of the guide means which may be used in cases where it is possible to dispense with lateral insertion of the electrode into the guide means, i.e. with the lateral division of the guiding members, for example in cases where an automatic threading device is available, such as the device described in Swiss Specification No. 559,599. The embodiment comprises an annular member 123 which has a flange at one end and which is mounted in the housing of the head assembly 5. Disposed in the interior of the member 123 is a guide tube 124 in which the electrode 1 is guided. The tube is retained radially and axially in the member 123 and is sealed by sealing elements 125 (for example conventional O-rings) against loss of a fluid 126, which fluid 126 is contained in an annular chamber formed within the member 123 about the tube 124. The pressure exerted by the fluid on the tube 124 can be varied by screwing a threaded piston member 127 into or out of a threaded cylinder bore, which communicates with the annular chamber. Due to the pressure applied annularly to the tube 124, the latter is radially so shrunk that play-free and precise guiding of the electrode 1 is achieved. Also, it is possible to clamp the wire within the tube by further increasing the pressure, and this may for example serve for making it possible, with controlled movement of the head assembly in the wire travel direction, to effect drilling work with the same plant. Instead of the hydraulic forces described, it is also possible to employ mechanical means which come into contact with the tube, for example spring forces or obliquely arranged needles, so as to exert the appropriate shrinkage forces on the tube.

The described embodiments of the guide means may be modified by replacing the segmental or annular guiding elements by elements which give similar mechanical effects, for example by rollers, the varying axis of which is parallel or perpendicular to the direction of movement of the electrode or alternatively by balls simulating the three-point abutment according to the guiding principle shown in FIG. 4c. Furthermore, it is also possible to employ hydrodynamic bearing means or liquid magnets for achieving centering and guiding.

Figure 5A:
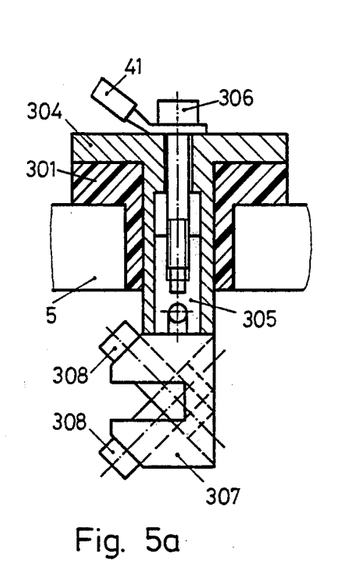
FIG. 5a is a sectioned elevation of means for making electrical contact with a tool electrode.

As shown in FIG. 5a, the first contact means 300, for making electrical contact with the tool electrode 1, may comprise a flanged insulating collar 301 which is mounted in a wall of the head assembly housing and into which there is inserted a correspondingly flanged sleeve member 304 such that the flange of the sleeve member 304 is outside the housing and the member extends into the housing. Inserted into the inner end of the member 304 is a part 305 which has a cross-bore engaged about a pin which is fixed across the bore of the sleeve member 304 so that the part 305 cannot rotate within the bore of the sleeve member 304. That end of the part 305 which is furthest inside the sleeve member 304 has a threaded hole in it and a screw 306 is engaged in this hole with the head of the screw outside the head assembly housing and connected to the line 41. The screw 306 thus serves to make electrical connection to the part 305 and to fix its axial position. The other end of the part 305 supports a forked holder 307 which, in turn, supports two cylindrical contact pins 308 the axes of which intersect and extend perpendicular to the direction of the wire. The cylindrical pins 308 are manufactured from a material which is a good conductor and which is simultaneously able to resist wear due to friction with the tool electrode 1. Any wear which does develop can be compensated for by rotation and/or axial displacement of the pins. In the notch (which again is V-shaped) formed by the two pins 308, the wire is pre-centered relative to geometrical guiding proper and simultaneously obtains two abutment faces for current transmission. Constructionally, the diameter of the pins is designed to be a maximum in order that therewith the contact surface may be as wide as possible and in order that surface application pressure need not be as high as otherwise. For achieving improved contact effect, the arrangement of the "crossed" rollers may be adjusted to a slightly oblique position relative to the wire axis, or instead of the cylindrical pins it is possible to use for example elliptical bodies.

Figure 5B:
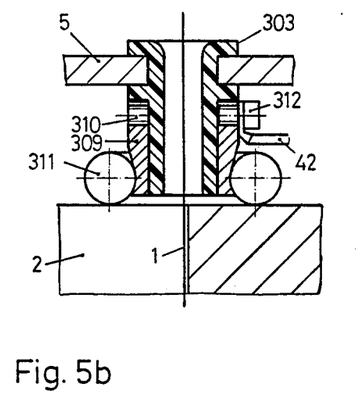
FIGS. 5b and 5c are sectioned elevations of respective embodiments of means for making electrical contact with a workpiece.

As shown in FIG. 5b, the second contact means 302, for making electrical contact with the workpiece, may be attached to a nozzle 303 which is made from electrically insulating material and which is arranged at the machining location sides of the head assembly 5 so as to convey the flushing fluid, coaxial to the electrode 1, towards the workpiece 2, the electrode 1 being surrounded by an envelope of the flushing fluid. The nozzle 303 is formed with an annular groove and the nozzle has been pushed into a slot, with the edges of the slot engaged in the groove, formed in the wall of the head assembly housing and centred on the axis of the electrode 1. The current line 42 is secured by means of a current contact screw 312 to an electrically conductive annular member 309, which has been pushed on to the electrically insulating nozzle 303 and secured by means of a screw (not shown) engaged in a hole 310 formed in the member 309. By loosening this screw, the position of the annular member 309 may be adjusted along the length of the nozzle 303. Moving towards its end nearest the workpiece 2, the external diameter of the member 309 reduces, in conical fashion, and then increases again such that, near this end of the member 309, there is formed an annular depression, in which depression there is engaged, so that it is held in position around the member 309, a toroidal helical spring 311. Due to the cone effect, this spring bears in such manner as to afford contact with the workpiece 2 and, if the distance between the member 309 and the surface of the workpiece varies, tends to move and hence to exert a compensating effect. The conically surfaced depression can, as an alternative, be machined in the interior surface of the bore of the member 309 and the spring held, in the depression, within this bore.

Figure 5C:
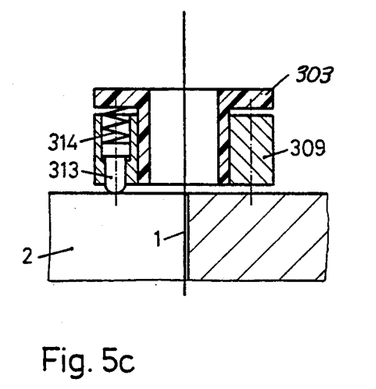

A second embodiment of the second contact means comprises, as shown in FIG. 5c, an annular member 309 which is formed with a plurality of holes disposed around and extending parallel to its central bore. This central bore is disposed around an insulating nozzle such that it can be adjusted in position towards and away from the workpiece 2 and then fixed by any suitable means (not shown) in the desired position. In the holes disposed around the central bore there are guided a plurality of sliding contact members 313 (only one of which can be seen) pressed by axial springs 314 against the workpiece 2, for establishing contact therewith.

In both FIGS. 5a and 5b, the interior both of the insulating nozzle 303 and also of the annular member 309 is in each instance so shaped that there is formed a scavenging nozzle which, to the maximum extent in laminar fashion, forms the supplied flushing fluid 7 into a coaxial scavenging jet about the wire electrode 1 travelling through the nozzle and feeds this scavenging jet into the machining location.

At this point, it should again be emphasized that the first and second contact means 300 and 302 (FIGS. 2, 3, 5a, 5b) are preferably as close to each other as possible, so that no induction on metal elements is possible in the conduction loop produced. To achieve this, naturally, it will be necessary to achieve in respect to the spatial dimensions of the corresponding structural elements a compromise relative to what would be desired if the construction were simple.

Figure 6A:
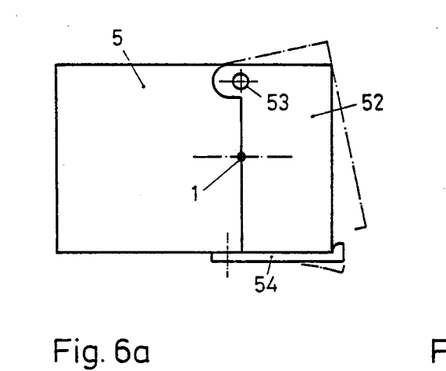
FIGS. 6a to 6c are plan views of respective embodiments of a housing for the head assembly of FIG. 2.
Figure 6B:
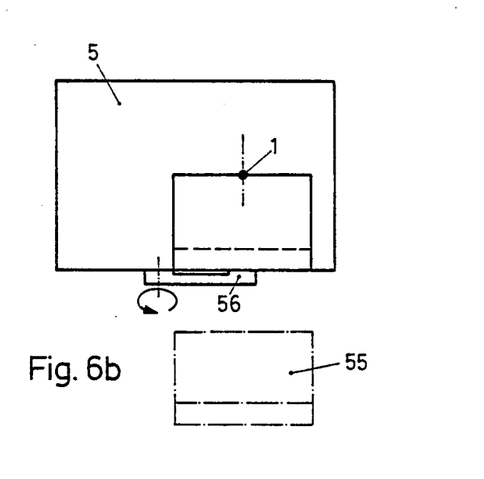
Figure 6C:
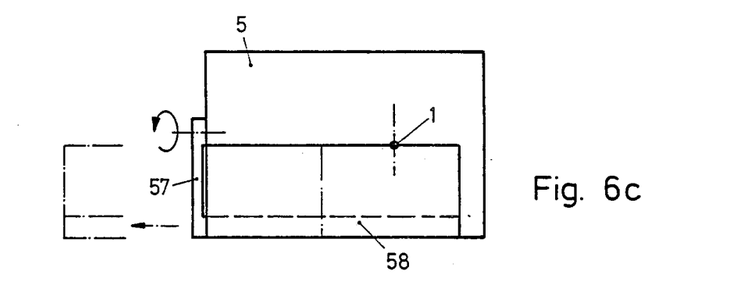

FIGS. 6a to 6c show three possible embodiments of the head assembly housing with which the electrode 1 can, prior to operation, be laterally inserted into the head assembly instead of being threaded through. There are shown views in which the tool electrode 1 is, in each case, located at the dotted line "cross" and extends perpendicular to the plane of the drawing. In FIG. 6a, the housing of the head assembly 5 is in two parts of which one part, 52, is mounted to pivot about a pivot pin 53, so that subsequent to resilient deflection of a catch 54 it can be pivoted towards the side, so as to obtain free access for insertion of the wire. In FIG. 6b, a U-shaped cover 55, pressed fluid-tight when in the closed position by a pivoted clamping lever 56, can be pulled completely away from the assembly after moving the said lever aside, this again giving access to the electrode guide means. A similar cover or lid structure can, in principle, be arranged at each free side of the head assembly 5. In FIG. 6c, a similar pivoted clamping lever 57 so releases the previously locked lid 58 that the latter can be slid unhindered towards the left of the Figure so uncovering an opening in the housing through which, again, access is obtained to the electrode guide means.

We claim:

1. Electro-erosion apparatus of the type in which an elongated tool electrode (1) is moved under tension between first and second head assemblies (5a, 5b) for performing an electro-erosion work process on a workpiece (2) wherein
   the workpiece is disposed between said head assemblies,
   each said head assemblies includes
   means (300a, 300b) for making electrical contact to said electrode and each of said head assemblies further includes means directing scavenging fluid to the electro-erosion location working gap,
   wherein each of said assemblies comprises a housing;
   fluid inlet means (200a, 200b) leading to the interior of the respective housing for passing scavenging fluid (7a, 7b) to the respective interior of the respective housing to fill the respective housing;
   an outlet nozzle (303) defining an opening between the interior and the exterior of the respective housing through which a tool electrode can pass from one housing to the other, and through which scavenging fluid also can pass from the interior of the respective housing as an envelope surrounding and in contact with said tool electrode, and being directed toward the workpiece;
   electrical contacts (300a, 300b) mounted in the respective interior of the respective housing and being cooled by the scavenging fluid therein and in electrical contact engagement with said tool electrode;
   and tool electrode guide means (100a, 100b) mounted in the interior of the respective housing, each guide means being cooled by the scavenging fluid within the respective housing and guiding said tool electrode in its path through said outlet means, at least one of said guide means comprising two support members (101, 102), two parallel pivot pins (119) attached to respective ones of said support members, a first set of polygonal guide plates (115, 116) rotatably mounted one above another on one of said pivot pins, and a second set of polygonal guide plates (117, 118) rotatably mounted one above another on the other of said pivot pins, said plates being so arranged in relation to one another that edge portions thereof bound a space in which said tool electrode can be located so that said edge portions are in sliding contact with said tool electrode and such that, for each plate, there is another one of said plates which is at the same level on said pivot pins and which contacts said tool electrode on the opposite side thereof.

2. Apparatus according to claim 1 wherein said plates are triangular and they are in contact with said tool electrode at four locations symmetrically disposed around the periphery of said tool electrode.

3. Apparatus according to claim 1, wherein one of said support members is mounted within said housing for movement towards and away from said other support member and wherein said first head assembly includes a screw mounted in said housing opposite said one member so that it can be turned to adjust its spacing from said one member, and a spring arranged between said screw and said one member such that said spring biases the said one support member towards said other support member and said screw adjusts the biassing force of said spring.

4. Apparatus according to claim 1, wherein one of said support members is movably mounted and is able to be moved away from the other said support member to facilitate insertion therebetween of said tool electrode.

5. Apparatus in accordance with claim 1, wherein said two respective head assemblies are similar in structure.

6. Apparatus in accordance with claim 1, further comprising
   a first electro-erosion power supply connection wire connected to said electrode contact of said first head assembly,
   and a second electro-erosion power supply connection wire connected to said electrode contact of said second head assembly,
   said first and second power supply connection wires operating independently of each other's load fluctuations to prevent overloading of said electrode between said workpiece and said one electrode contact as a result of a change in loading of said electrode between said workpiece and the other electrode contact.

7. Apparatus according to claim 6, further including first and second connecting wires making contact with the workpiece,
   wherein the first electro-erosion power supply connection wire connected to the electrode and the first workpiece connecting wire are twisted together,
   and the second electro-erosion power supply connection wire connected to the electrode contact and the second workpiece connecting wire are twisted together,
   whereby the effects of stray inductances are reduced.

8. Electro-erosion apparatus of the type in which an elongated tool electrode (1) is moved under tension between first and second head assemblies (5a, 5b) for performing an electro-erosion work process on a workpiece (2) wherein
   the workpiece is disposed between said head assemblies,
   each said head assemblies includes
   means (300a, 300b) for making electrical contact to said electrode and each of said head assemblies further includes means directing scavenging fluid to the electro-erosion locating working gap,
   wherein each of said assemblies comprises a housing;
   fluid inlet means (200a, 200b) leading to the interior of the respective housing for passing scavenging fluid (7a, 7b) to the respective interior of the respective housing to fill the respective housing;
   an outlet nozzle (303) defining an opening between the interior and the exterior of the respective housing through which a tool electrode can pass from one housing to the other, and through which scavenging fluid also can pass from the interior of the respective housing as an envelope surrounding and in contact with said tool electrode, and being directed toward the workpiece;

electrical contacts (300a, 300b) mounted in the respective interior of the respective housing and being cooled by the scavenging fluid therein and in electrical contact engagement with said tool electrode;

and tool electrode guide means (100a, 100b) mounted in the interior of the respective housing, each guide means being cooled by the scavenging fluid within the respective housing and guiding said tool electrode in its path through said outlet means, at least one of said guide means comprising means defining a V-shaped notch, and a counter assembly comprising a support member (102), a pivot pin (119) attached to said support member for extending parallel to the axis of said tool electrode, and a set of triangular guide plates rotatably mounted one above another on said pivot pin, said plates being positioned in relation to one another and in relation to the V-shaped notch defining means so that edge portions of the plates and the sides of the notch bound a space in which said tool electrode can be located so that said edge portions and notch sides are in sliding contact with said tool electrode at four locations symmetrically disposed around the periphery of said tool electrode.

9. Apparatus in accordance with claim 8, wherein said two respective head assemblies are similar in structure.

10. Apparatus in accordance with claim 8, further comprising
a first electro-erosion power supply connection wire connected to said electrode contact of said first head assembly,
and a second electro-erosion power supply connection wire connected to said electrode contact of said second head assembly,
said first and second power supply connection wires operating independently of each other's load fluctuations to prevent overloading of said electrode between said workpiece and said one electrode contact as a result of a change in loading of said electrode between said workpiece and the other electrode contact.

11. Apparatus according to claim 10, further including first and second connecting wires making contact with the workpiece,
wherein the first electro-erosion power supply connection wire connected to the electrode and the first workpiece connecting wire are twisted together,
and the second electro-erosion power supply connection wire connected to the electrode contact and the second workpiece connecting wire are twisted together,
whereby the effects of stray inductances are reduced.

* * * * *